(No Model.)

W. R. PITT.
FLAG AND OTHER POLES, &c.

No. 351,463. Patented Oct. 26, 1886.

Witnesses.
Emil Herter
C. Sundgren

Inventor.
Wm R. Pitt
by his attys
Brown & Hill

United States Patent Office.

WILLIAM R. PITT, OF BROOKLYN, NEW YORK.

FLAG AND OTHER POLES, &c.

SPECIFICATION forming part of Letters Patent No. 351,463, dated October 26, 1[886].

Application filed December 24, 1885. Serial No. 186,662. (No model.)

*To all whom it may concern:*

Be it known that I, WILLIAM R. PITT, of Brooklyn, in the county of Kings and State of New York, have invented a new and useful Improvement in Flag-Poles and other Poles and Spars, of which the following is a specification.

My invention, although it is at present more particularly intended for flag-poles, may be employed in other taper poles or spars.

The object of the invention is to provide a very light, strong, and serviceable metal pole or spar which is made in sections, so that it may be readily transported from place to place, and so that the sections may be readily connected and disconnected.

The invention consists, essentially, in a pole or spar of taper form, composed of sections of taper tubing, and coupling-pieces secured in the ends of the sections of tubing, and provided, respectively, with male and female screw-threads, whereby they may be readily coupled together to form the completed pole or spar, and as readily disconnected from each other when it is desired to transport them from place to place.

Figure 1:
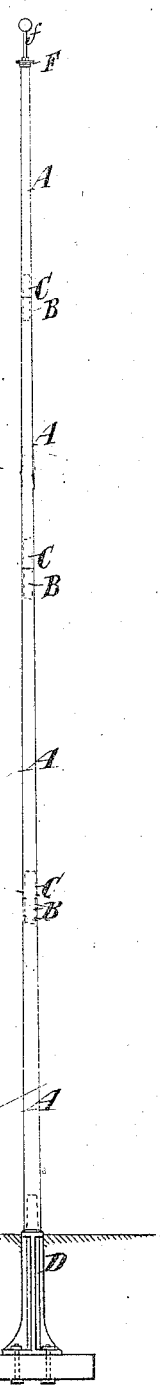
Figure 2:
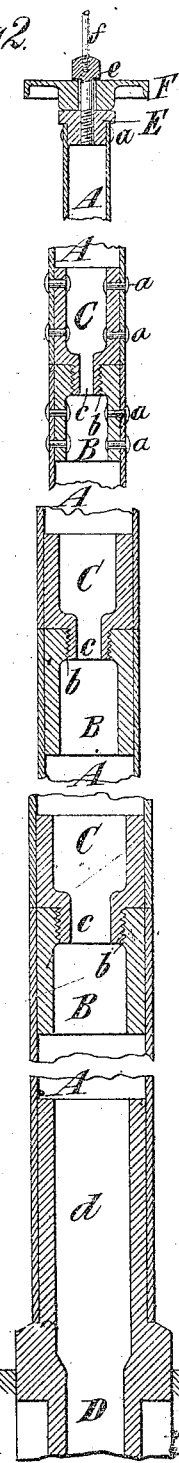
Figure 3:

In the accompanying drawings, Figure 1 is an elevation of a flag-pole embodying my invention, and composed of four sections in addition to the base-piece. Fig. 2 is a vertical section upon a larger scale, illustrating only the upper portion of the base-piece and the adjacent ends of sections which are coupled together; and Fig. 3 is a plan of the base-piece.

Similar letters of reference designate corresponding parts in all the figures.

The pole or spar consists, essentially, of sections A of metallic tubing, which are of tapered form and of such diameters that when coupled together they will form a pole or spar which is approximately of true taper from bottom to top, as is a wood pole or spar. These taper sections of tubing may be produced in any suitable way—as, for example, they may be made of spiral riveted or jointed pipe, which is formed by a strip wound spirally and having the edges of its convolutions united by riveting or otherwise. This is a convenient way of making a taper tube of metal; but the taper-tube sections may be made in any other suitable manner. In the adjacent ends of the taper-tube sections A are inserted coupling-pieces B C, which may be of cast metal, and may be driven into or otherwise secured in the tube-sections A. In Fig. 2 I have represented these coupling-pieces as simply driven into the tubing in the lower portion of the figure, and in the upper portion of the figure I have represented them as secured in the tubing by rivets *a*. Any other suitable means may be employed for securing the coupling-pieces within the sections of tubing.

The coupling-pieces B are provided with sockets *b*, formed with female screw-threads, and the coupling-pieces C have corresponding projections, *c*, provided with male screw-threads. By these screw-threads the sections which compose the pole or spar may be readily secured together, so that the adjacent ends of the sections abutting together, as shown in Fig. 2, form a pole or spar having an approximately continuous and true taper from end to end. I have here represented the flag-pole as having a cast-metal base-piece, D, which is formed with a cylindric projection, *d*, over which the lower section A of the pole is driven, or on which it is otherwise secured, and I have represented the top section A of the pole as having a cast-metal plug or head, E, inserted in it and secured by rivets *a*, or otherwise. I have represented a bolt, *e*, as screwed into the top head or plug, E, and securing thereon a cap-piece, F, and I have also shown a finial ornament, *f*, as set in the bolt *e*.

The pole or spar above described being of metal, is almost indestructible, and if employed as a flag-pole will not have soon to be reset, as will a wood pole because of the lower end of the pole which is set in the ground rotting off. The pole also has an additional advantage, inasmuch as it is composed of sections which may be readily connected with and disconnected from each other, and provides for the pole or spar being conveniently transported from place to place.

What I claim as my invention, and desire to secure by Letters Patent, is—

1. A flag-pole or other pole or spar, consisting of sections of taper metallic tubing, and coupling-pieces secured in the adjacent ends of the sections and secured together by male and female screw-threads, substantially as herein described.

2. A flag-pole or other pole or spar, consisting of sections of taper metallic tubing, and coupling-pieces inserted in the adjacent ends of the tubing-sections, and provided, respectively, with sockets $b$, having female screw-threads, and projections $c$, having male screw-threads, substantially as herein described.

WM. R. PITT.

Witnesses:
FREDK. HAYNES,
M. LINDEMAN.